Sept. 5, 1944.   G. F. ARMBRUSTER   2,357,625
ENGINE TESTING APPARATUS
Filed Aug. 5, 1943
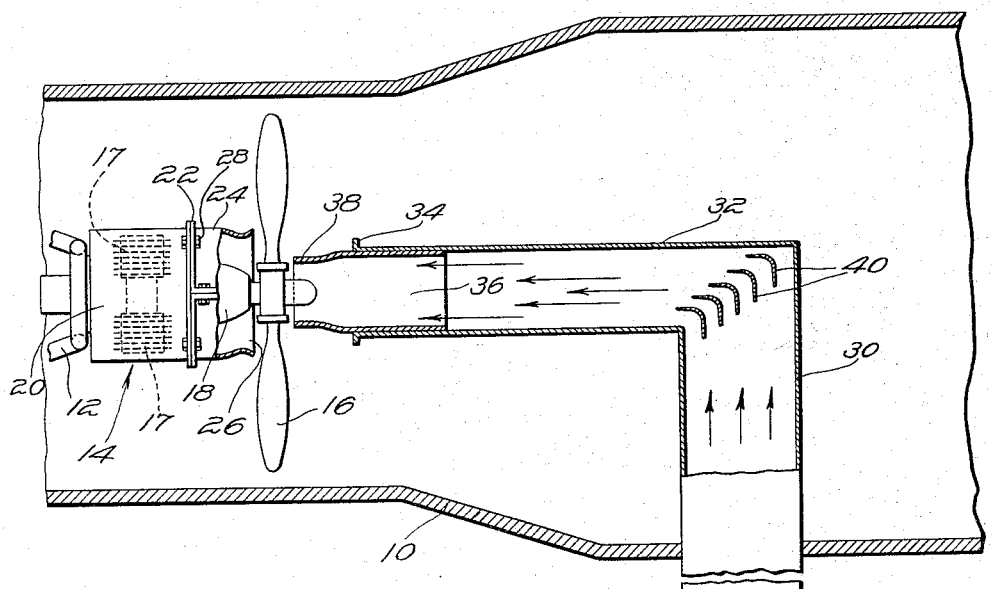
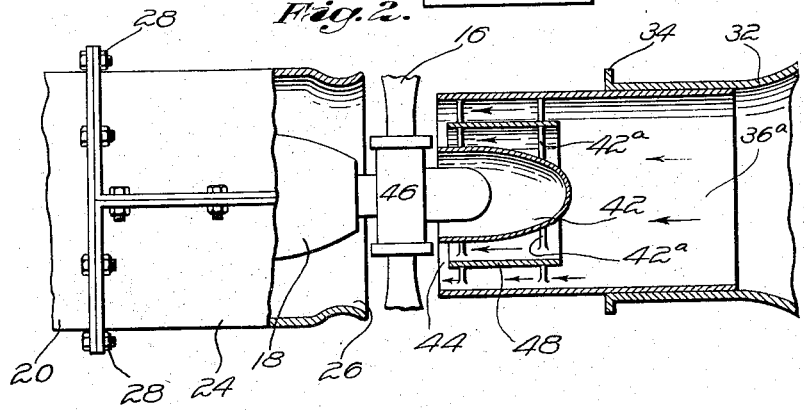
INVENTOR
George F. Armbruster
BY Charles L. Shelton
Attorney Patented Sept. 5, 1944

2,357,625

UNITED STATES PATENT OFFICE 2,357,625

ENGINE TESTING APPARATUS

George F. Armbruster, Glastonbury, Conn., assignor to United Aircraft Corporation, East Hartford, Conn., a corporation of Delaware Application August 5, 1943, Serial No. 497,482

8 Claims. (Cl. 73—51)

This invention relates to engine testing apparatus and particularly to apparatus for testing air-cooled engines of the type used in aircraft.

An object of the invention is to provide improved testing apparatus which will enable an engine to be tested under conditions which simulate actual flight conditions and maintained properly cooled by a controlled flow of cooling air passing the engine cylinders which is set up and controlled independently of the engine being tested.

Another object of the invention is to provide testing apparatus for cooling an air-cooled engine having a propeller coaxially associated therewith for absorbing the engine power output, by which a high velocity jet of cooling air aimed at the propeller hub is expanded inside the engine cowling to pass at a reduced velocity over the cylinder cooling surfaces to cool the engine.

A further object of the invention is to provide an improved and simplified engine testing apparatus which will facilitate positioning of the engine on and removal of the engine from the test stand.

A still further object of the invention is to provide such improved apparatus eliminating special test cowlings and enabling engines to be tested in their completely assembled condition with the standard engine cowling in place ready for installation in a plane.

A yet further object of the invention is to provide testing apparatus which is adapted to test air-cooled engines of widely different size and type without requiring time consuming changes in the testing apparatus.

Other objects of the invention include the provision of a testing apparatus in which the propeller blade is used for engine loading only; and the provision of such apparatus in which the accessibility of the engine during test is greatly enhanced.

A further object is generally to improve the construction and operation of engine testing apparatus.

Other objects and advantages will be pointed out hereinafter or will become apparent from the following description.

In the accompanying drawing, in which like reference characters are used to designate similar part throughout, there is illustrated by way of example two embodiments of the invention in connection with testing apparatus for air-cooled engines of the radial type, but it is to be understood that the invention is applicable to other types of engines.

In the drawing—

Fig. 1 is a somewhat diagrammatical sectional view of the apparatus showing an engine in position for testing; and Fig. 2 is an enlarged view showing a modified form of air delivery means.

In testing air-cooled engines it has been the practice to mount the engine on a stand, and to mount a propeller, or club, of suitable size to be driven by the engine shaft to absorb the engine power and blow a current of cooling air past the engine cylinders. This arrangement, however, is not suitable for engines of high power output as a propeller of sufficient pitch and diameter to absorb the power output would be too large in diameter to direct the cooling air onto the cylinders.

It has also been proposed to cool such large engines by enclosing the engine in a large cowl-like enclosure and setting up a current of air by some power means external of the engine which was directed from the rear of the engine to the forward end of the enclosure from which the air flowed through the engine to the rear again to cool the engine; but this has the objection that with short nosed engines it is impossible to pass enough air through the cowling to adequately cool the engine. Further with this apparatus the air does not pass evenly distributed radially over the cooling fins on the engine cylinders and thus does not provide cooling representative of that experienced in service. Also a test setup for one engine is not suitable for another engine of different size or type, each different size or type requiring a different enclosing cowl. Further, with such an arrangement each engine to be tested has to have the special enclosure attached and subsequently removed before another engine can be tested. As a result considerable time is consumed in setting up an engine for testing.

The present invention provides an improved air circulating and cooling system which overcomes these objections and limitations and which enables a wide variety and size of engine to be tested satisfactorily under working conditions and without the need for special engine enclosures.

Referring to Fig. 1, the numeral 10 indicates a test house, or tunnel, open at its opposite ends in which a test stand 12 is provided for supporting an engine 14 to be tested. A propeller 16 is mounted on the engine in the usual manner and is driven thereby either directly from the engine crankshaft or through reduction gearing located in the nose section 18 of the engine. The engine is mounted on the stand 12 with its standard annular cowling or head baffle 20 closely surrounding the engine cylinders 17 which are provided with the usual cooling fins. The cowling or baffling 20 has a forward annular flange 22 fastened to the cowl seal ring to which is temporarily attached an annular air receiving section 24 having its flared mouth 26 terminating adjacent the hub of the propeller 16. This section 24 is removably attached to the flange 22 by means of bolts 28 shown in Fig. 2 and is longitudinally split to form two sections, thus enabling it to be put in place without first removing the propeller.

The propeller 16 can be of any desired diameter and of any desired pitch to absorb the power output of the engine without reference to cooling the engine by the airflow set up by the rotating blades. The cooling air for the engine is provided by a fan or blower 29 driven from a separate source of power, the discharge of which is directed through a high velocity air duct 30 which may enter, for example, from the roof or from the side of the test room, as indicated in Fig. 1. The duct 30 has a section 32 which is axially disposed with respect to the engine and propeller combination and which terminates in an annular flange 34 disposed in spaced relation to the propeller on the opposite side thereof from the flared mouth 26 leading to the engine cowling. The duct section 32 is provided with a telescoping section 36 terminating in a reduced diameter nozzle 38 which is adjustable toward and from the hub of the propeller 16. Flow directing baffles 40 may be provided at the intersections of duct sections 30 and 32 in a well-known manner.

The engine 14 to be tested is mounted on the test stand with the engine cowling 20, annular air receiving section 24 and the propeller 16 in place. It will be understood that to facilitate the mounting of the engine on the test stand the nozzle carrying section 36 is telescoped into the duct section 32 so that the engine and propeller combination can be readily moved into position on the stand and the various connections can be made to the engine with facility. Duct section 36 is then adjusted to locate the nozzle 38 at the desired distance from the propeller hub.

During the test run on the engine, air discharged at high velocity from the nozzle 38 passes through the propeller and enters the mouth 26 of the air receiving ring 24 which communicates with the engine cowling 20. As the high velocity air from nozzle 38 enters the larger diameter cowling a considerable reduction in velocity with corresponding increase in pressure takes place, resulting in a slower flow of cool air over the cooling fins of the engine cylinders within the cowling.

In Fig. 2 a somewhat modified form of telescoping nozzle section is illustrated, which is desirable with propellers having large hubs. In this figure a duct section 36a is provided of uniform cross-section throughout its length, the reduction in cross-sectional area at the outlet end to provide the nozzle effect being provided by means of a concentric thimble, or baffle, 42 which provides a restricted annular discharge passage, or nozzle, 44 surrounding the hub 46 of the propeller. The thimble 42 may be supported in any suitable way, slender radial rods 42a being here shown supporting the thimble from the wall of the duct section 36a. One or more annular flow directing baffles 48 may be provided in this annular passage 44 suitably supported as by the rods 42a which support the thimble. The operation of this modification is generally similar to that described in connection with Fig. 1 except that instead of the solid jet of air obtained in the Fig. 1 construction an annular jet is provided as a result of the presence of baffle 42.

As a result of these improvements it is made possible to test engines of varying size and type without changing the setup of the test apparatus. Further, the engine under test is more accessible during the setting up of the test and during test if work has to be done while it is on the stand. The provision of a high velocity air jet discharging into the standard engine enclosing cowling not only eliminates large special engine enclosures formerly required but also, by utilizing the actual cowling used on the engine in flight, provides a better cooling effect. By reason of the telescoping nozzle sections 36 and 36a the installation of the engine on the test stand is greatly facilitated and the subsequent telescoping adjustment of the nozzle section accommodates engines of widely varying type to be tested while enabling the high velocity air jet to be properly located relative to the propeller. It will thus be evident that an exceedingly simple and effective means is provided for obtaining an improved relatively low velocity cooling flow of expanding air about and through the cooling fins of the engine cylinders for a wide variety of engines to be tested.

While two embodiments of the invention have been shown in the accompanying drawing for purposes of disclosing the invention, it will be understood that the invention is not limited to the constructions and arrangements shown in the drawing but that numerous changes in the size, shape and arrangement of the various elements may be made within the scope of the following claims.

What it is desired to secure by Letters Patent is as follows:

1. Apparatus for power testing air-cooled internal combustion engines comprising, a test room having passages for incoming and outgoing air, a propeller driven by and arranged in tandem with the engine to be tested in said room for absorbing the power output of the engine, a cowling enclosing the engine having an air receiving opening adjacent the hub portion of said propeller, means for expanding a high velocity jet of cooling air within said cowling including a duct in front of said propeller having its discharge end located adjacent the hub portion thereof and discharging through said propeller into the air receiving opening in said cowling, and means for setting up a high velocity air flow through said duct.

2. Apparatus for power testing air-cooled internal combustion engines having cylinders provided with cooling flanges thereon comprising, a test room having passages for incoming and outgoing air, a propeller driven by the engine to be tested and mounted in tandem therewith in said test room for absorbing the power output of the engine, a cowling enclosing said cylinders having an air receiving opening adjacent said propeller, an air duct extending into said room and terminating in an air nozzle located adjacent and on the opposite side of said propeller from said cowl opening and discharging into the latter, and means for supplying air under pressure through said air duct to said nozzle, said cowling having means for receiving the high velocity air jet from said nozzle and expanding the same in the vicinity of the engine cylinders.

3. Apparatus for power testing air-cooled internal combustion engines having cylinders provided with cooling flanges thereon, a test room having passages for incoming and outgoing air, a propeller driven by the engine being tested and arranged in tandem in said room therewith for absorbing the power output of the engine, a cowling enclosing the engine having an air receiving opening adjacent said propeller, a pressure air duct located in axial alignment with the engine and propeller on the opposite side of said propeller from said cowling for discharging a high velocity jet of air through said propeller into said cowling, said duct including a fixed section terminating at a point spaced from said propeller and a telescoping nozzle section adjustable axially toward and from said propeller, and means for supplying air under pressure to said duct.

4. Apparatus for power testing air-cooled internal combustion engines having cylinders provided with cooling flanges thereon, a test room, a propeller driven by the engine being tested and arranged in tandem therewith in said room for absorbing the power output of the engine, a cowling enclosing the engine cylinders, a longitudinally divided ring detachably secured to the front of said cowling and having an air receiving open end adjacent said propeller, a pressure air duct located in axial alignment with the engine and propeller on the opposite side of said propeller from said the open end of said ring for discharging a high velocity jet of cooling air through said propeller into said cowling, and means for supplying air under pressure to said duct.

5. Apparatus for power testing air-cooled internal combustion engines having cylinders provided with cooling flanges thereon, a test room having passages for incoming and outgoing air, a propeller driven by the engine being tested and arranged in tandem therewith in said room for absorbing the power output of the engine, a cowling enclosing the engine having an air receiving opening adjacent said propeller, a pressure air duct located in axial alignment with the engine and propeller on the opposite side of said propeller from said cowling, said duct including a fixed section and a telescoping nozzle section of reduced diameter adjustable axially toward and from said propeller and discharging into the open end of said cowling, and said cowling being of larger diameter than said duct and constituting an air expansion chamber, and means for supplying air under pressure to said duct.

6. Apparatus for power testing air-cooled internal combustion engines, a test room having passages for incoming and outgoing air, a propeller driven by the engine being tested and arranged in tandem therewith in said room for absorbing the power output of the engine, a cowling enclosing the engine having an air receiving opening adjacent the hub portion of said propeller, means for expanding a high velocity jet of cooling air within said cowling including an air duct in front of said propeller having a telescoping nozzle section movable axially toward and from said propeller and including flow directing baffle means axially aligned with said propeller hub and cooperating with the walls of said air duct for directing the air discharged therefrom in a hollow jet around said hub and through the blades of said propeller into said engine cowling, and means for setting up a high velocity air flow through said duct.

7. Apparatus for power testing air-cooled internal combustion engines, a test room having passages for incoming and outgoing air, a propeller driven by the engine being tested and arranged in tandem therewith in said room for absorbing the power output of the engine, a cowling enclosing the engine having an air receiving opening adjacent the hub portion of said propeller, means for expanding a high velocity jet of cooling air within said cowling including an air duct in front of said propeller having a telescoping nozzle section movable axially toward and from said propeller, said nozzle section having a baffle coaxial with said hub and cooperating with the annular side walls of said nozzle section to provide a restricted annular passage surrounding said hub and also having flow directing baffle means in said passage for effecting a substantially straight line discharge through said propeller into said cowling, and means for setting up a high velocity air flow through said duct.

8. Apparatus for power testing air-cooled internal-combustion engines of the type having radially disposed air-cooled cylinders comprising, a test room in which the engine is adapted to be mounted, a head baffle enclosing the engine cylinders, a propeller driven by the engine under test for absorbing the power output of the engine, means on the opposite side of said propeller from the engine for supplying a high velocity jet of cooling air, including a duct having its discharge end terminating close to and immediately surrounding the hub portion of said propeller, air receiving means on the engine side of said propeller having a front air receiving opening close to said propeller receiving the discharge from said duct and having a rear air discharge opening communicating with said head baffle, and means for setting up a high velocity air flow through said duct.

GEORGE F. ARMBRUSTER.